(12) United States Patent
Namba et al.

(10) Patent No.: US 11,962,048 B2
(45) Date of Patent: *Apr. 16, 2024

(54) FUEL CELL SYSTEM WITH IMPROVED LOW TEMPERATURE OPERATION

(71) Applicant: TOYOTA JIDOSHA KABUSHIKI KAISHA, Toyota (JP)

(72) Inventors: Ryouichi Namba, Okazaki (JP); Masahiro Ito, Toyota (JP); Manabu Takahashi, Toyota (JP); Tomotaka Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

This patent is subject to a terminal disclaimer.

(21) Appl. No.: 17/223,825

(22) Filed: Apr. 6, 2021

(65) Prior Publication Data

US 2021/0328239 A1  Oct. 21, 2021

(30) Foreign Application Priority Data

Apr. 20, 2020  (JP) ................ 2020-074653

(51) Int. Cl.
*H01M 8/04858* (2016.01)
*H01M 8/04082* (2016.01)
(Continued)

(52) U.S. Cl.
CPC ..... *H01M 8/0488* (2013.01); *H01M 8/04201* (2013.01); *H01M 8/04225* (2016.02);
(Continued)

(58) Field of Classification Search
CPC .................................. H01M 8/0488
(Continued)

(56) References Cited

U.S. PATENT DOCUMENTS 6,455,180 B1 * 9/2002 Mowery ........... H01M 8/04559
429/432
11,476,478 B2 * 10/2022 Namba ............. H01M 8/04873
(Continued)

FOREIGN PATENT DOCUMENTS

CN      105609831 A    5/2016
JP     2005071626 A    3/2005
(Continued)

OTHER PUBLICATIONS

Ryouichi Namba, U.S. Appl. No. 17/221,006, filed Apr. 2, 2021.
(Continued)

*Primary Examiner* — Yalkew Fantu
(74) *Attorney, Agent, or Firm* — Dickinson Wright, PLLC

(57) ABSTRACT

A fuel cell system includes a fuel cell stack and a control device that controls operation of the fuel cell system based on a measured voltage value measured by a voltage sensor. When the fuel cell system is started and a value measured by a temperature sensor is equal to or less than a temperature determined in advance, the control device raises the voltage of the fuel cell stack until a voltage condition determined in advance is met, by supplying a cathode with an oxidant gas before current sweep is started. The control device sets a voltage command value and a current command value such that an operation point of the fuel cell stack is on an equal power line of the fuel cell stack when the operation point is caused to transition in at least a part of a transition period.

4 Claims, 10 Drawing Sheets

(51) Int. Cl.
  *H01M 8/04223* (2016.01)
  *H01M 8/04225* (2016.01)
  *H01M 8/04302* (2016.01)
  *H01M 8/0432* (2016.01)
  *H01M 8/04537* (2016.01)
  *H01M 8/04701* (2016.01)
  *H01M 8/04992* (2016.01)
  *H01M 16/00* (2006.01)
  *H02J 7/34* (2006.01)

(52) U.S. Cl.
  CPC ... *H01M 8/04268* (2013.01); *H01M 8/04302* (2016.02); *H01M 8/0432* (2013.01); *H01M 8/04559* (2013.01); *H01M 8/04701* (2013.01); *H01M 8/0491* (2013.01); *H01M 8/04992* (2013.01); *H01M 16/006* (2013.01); *H02J 7/34* (2013.01)

(58) Field of Classification Search
  USPC .......................................................... 320/101
  See application file for complete search history.

(56) References Cited

U.S. PATENT DOCUMENTS

| | | |
|---|---|---|
| 2004/0033396 A1 | 2/2004 | Thompson et al. |
| 2005/0053810 A1 | 3/2005 | Kato et al. |
| 2006/0210853 A1* | 9/2006 | Fukuda ............ H01M 8/04552 429/432 |
| 2010/0112402 A1 | 5/2010 | Ogawa |
| 2010/0136447 A1 | 6/2010 | Kumei et al. |
| 2010/0266920 A1 | 10/2010 | Kanie et al. |
| 2011/0136028 A1 | 6/2011 | Lee et al. |
| 2016/0141667 A1 | 5/2016 | Kaneko et al. |
| 2018/0145356 A1 | 5/2018 | Tsuruta et al. |
| 2019/0207233 A1 | 7/2019 | Procter et al. |
| 2021/0328243 A1* | 10/2021 | Namba ............ H01M 8/04544 |

FOREIGN PATENT DOCUMENTS

| | | |
|---|---|---|
| JP | 2005085578 A | 3/2005 |
| JP | 2008-269813 A | 11/2008 |
| JP | 6187774 B2 | 8/2017 |
| JP | 6597566 B2 | 10/2019 |
| KR | 20110063136 A | 6/2011 |
| KR | 20160057980 A | 5/2016 |
| WO | 2012140742 A1 | 10/2012 |

OTHER PUBLICATIONS

Ryouichi Namba, Office Action issued to U.S. Appl. No. 17/221,006 dated Apr. 28, 2022.

Ryouichi Namba, Notice of Allowance issued to U.S. Appl. No. 17/221,006 dated Aug. 24, 2022.

* cited by examiner

FUEL CELL SYSTEM WITH IMPROVED LOW TEMPERATURE OPERATION

INCORPORATION BY REFERENCE

The disclosure of Japanese Patent Application No. 2020-074653 filed on Apr. 20, 2020 including the specification, drawings and abstract is incorporated herein by reference in its entirety.

BACKGROUND

1. Technical Field

The present disclosure relates to the technology of a fuel cell system.

2. Description of Related Art

There has hitherto been known a fuel cell system in which warm-up operation is performed with the amount of an oxidant gas supplied to a cathode reduced compared to that during normal power generation (e.g. Japanese Patent No. 6187774).

SUMMARY

In the related art, when the fuel cell system performs the warm-up operation, an upper limit current and a lower limit current are set, and a current target value is set as a current command value such that the current target value falls within the range between the upper limit current and the lower limit current when the current target value is out of the range between the upper limit current and the lower limit current. In the related art, in addition, the upper limit current is set using, as an index, a current value which is limited in order to limit a rise in the concentration of hydrogen to be discharged from a fuel cell stack due to pumping hydrogen. In a transition period until a transition is made to a target operation point determined by the target current value and a target voltage value for the fuel cell stack, however, an oxidant gas may be short and pumping hydrogen may be generated at a cathode of fuel cells. When pumping hydrogen is generated in the fuel cells, a sufficient oxidant gas is not supplied to the surface of a catalyst of the cathode because of the pumping hydrogen, and therefore it is highly likely that pumping hydrogen is also generated thereafter. When pumping hydrogen is generated at the cathode, the concentration of hydrogen in a gas discharged from the cathode may be high. In addition, the fuel cell system includes a secondary battery to be charged with and discharge power generated by the fuel cell stack. The warm-up operation is executed when the outside air temperature is below the freezing point, for example. The allowable range of the charge/discharge amount may be limited at a temperature below the freezing point, depending on the type of the secondary battery. Hence, when the warm-up operation is executed at a temperature below the freezing point, it is occasionally difficult to control the charge/discharge amount of the secondary battery within the allowable range, that is, within a certain range. The term "pumping hydrogen" refers to hydrogen generated at the cathode by recombination of hydrogen ions and electrons conducted from an anode because of the shortage of oxygen at the cathode during warm-up operation.

The present disclosure can be implemented in the following aspect.

An aspect of the present disclosure provides a fuel cell system. The fuel cell system includes: a fuel cell stack that has a plurality of stacked fuel cells each having an anode and a cathode; a voltage sensor configured to measure a voltage of the fuel cell stack; an oxidant gas supply system configured to supply the cathode with an oxidant gas containing oxygen; a fuel gas supply system configured to supply the anode with a fuel gas; a temperature sensor configured to measure a temperature related to the fuel cell system; a secondary battery configured to be charged with power generated by the fuel cell stack and discharge the power; and a control device configured to control operation of the fuel cell system based on a measured voltage value measured by the voltage sensor, in which: the control device is configured to, when the fuel cell system is started and a value measured by the temperature sensor is equal to or less than a temperature determined in advance, raise the voltage of the fuel cell stack until a voltage condition determined in advance is met, by causing the oxidant gas supply system to operate and supplying the cathode with the oxidant gas before current sweep from the fuel cell stack is started, and execute warm-up operation in which a temperature of the fuel cell stack is raised, by starting the current sweep when the measured voltage value meets the voltage condition; and the control device is configured to, when executing the warm-up operation, set a voltage command value and a current command value such that an operation point determined by a voltage value and a current value of the fuel cell stack is on an equal power line of the fuel cell stack, which indicates the same generated power as required generated power of the fuel cell stack, when the operation point is caused to transition in at least a part of a transition period from the start of the current sweep until the operation point reaches a target operation point determined by a target voltage value and a target current value during the warm-up operation. With this aspect, warm-up operation can be performed after sufficient oxygen is provided to the cathode of the fuel cell stack, by starting current sweep after the measured voltage value meets a voltage condition determined in advance. Consequently, it is possible to reduce the possibility that pumping hydrogen is generated because of the lack of oxygen at the cathode during warm-up operation. Moreover, the control device sets the voltage command value and the current command value such that the operation point is on the equal power line when the operation point is caused to transition in the transition period, and thus deviation of the actual power generated by the fuel cell stack from the required generated power can be suppressed. Consequently, the charge/discharge amount of the secondary battery can be controlled within a certain range. With the above aspect, as described above, the charge/discharge amount of the secondary battery can be controlled within a certain range while reducing the possibility that pumping hydrogen is generated.

In the aspect described above, the control device may be configured to: execute normal current control in which the current command value is raised to the target current value at a proportion determined in advance in a post-switch period, of the transition period, from a time when the measured voltage value has become equal to or less than a switching voltage value determined in advance until a time when the measured voltage value reaches the target voltage value of the target operation point; suspend the normal current control and execute stand-by control in which the current command value is kept constant when the normal current control is executed and the measured voltage value reaches a control start voltage value which is less than the voltage command value; and end the stand-by control and resume the normal current control by permitting a change in the current command value when the measured voltage value reaches a permission voltage value which is equal to or more than the voltage command value during execution of the stand-by control. With this aspect, in the post-switch period, the normal current control is executed, and thus execution of excessive current sweep can be suppressed. With this aspect, in addition, the shortage of oxygen at the cathode can be suppressed by executing the stand-by control when the normal current control is executed and the measured voltage value reaches the control start voltage value. Thus, generation of pumping hydrogen can be suppressed.

In the aspect described above, the voltage sensor may be configured to measure a total voltage of the fuel cell stack; and the voltage condition may be a condition that a value of the total voltage as the measured voltage value measured by the voltage sensor has become more than a reference voltage value determined in advance. With this aspect, it is possible to determine, based on the value of the total voltage of the fuel cell stack, whether the voltage condition determined in advance is met.

In the aspect described above, supply of the oxidant gas to the fuel cell stack may be performed on a side of a first end portion of the fuel cell stack in a stacking direction in which the fuel cells are stacked; the voltage sensor may be configured to measure a voltage of an end portion-side fuel cell which is a fuel cell among the fuel cells, the end portion-side fuel cell being positioned on a side of a second end portion which is opposite from the side of the first end portion; and the voltage condition may be a condition that a voltage value of the end portion-side fuel cell as the measured voltage value measured by the voltage sensor has become more than an end portion-side reference voltage value determined in advance. With this aspect, generation of pumping hydrogen can be further suppressed by determining whether the voltage value on the side of the second end portion meets a voltage condition determined in advance, even if the fuel cell stack is so long in the stacking direction that it takes a considerable time for the oxidant gas to reach the side of the second end portion. Supply of the oxidant gas to the side of the second end portion of the fuel cell stack is delayed compared to the side of the first end portion of the fuel cell stack, and therefore the voltage rise on the side of the second end portion due to the supply of the oxidant gas tends to be delayed compared to the side of the first end portion. Hence, generation of pumping hydrogen can be further suppressed by determining whether the voltage value on the side of the second end portion, the voltage rise on which tends to be delayed, meets the voltage condition determined in advance.

The present disclosure can be implemented in a variety of forms. Besides the fuel cell system described above, the present disclosure can be implemented in the form of a control method for the fuel cell system, a computer program that causes a computer to execute the control method, a non-transitory storage medium that stores the computer program, etc.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
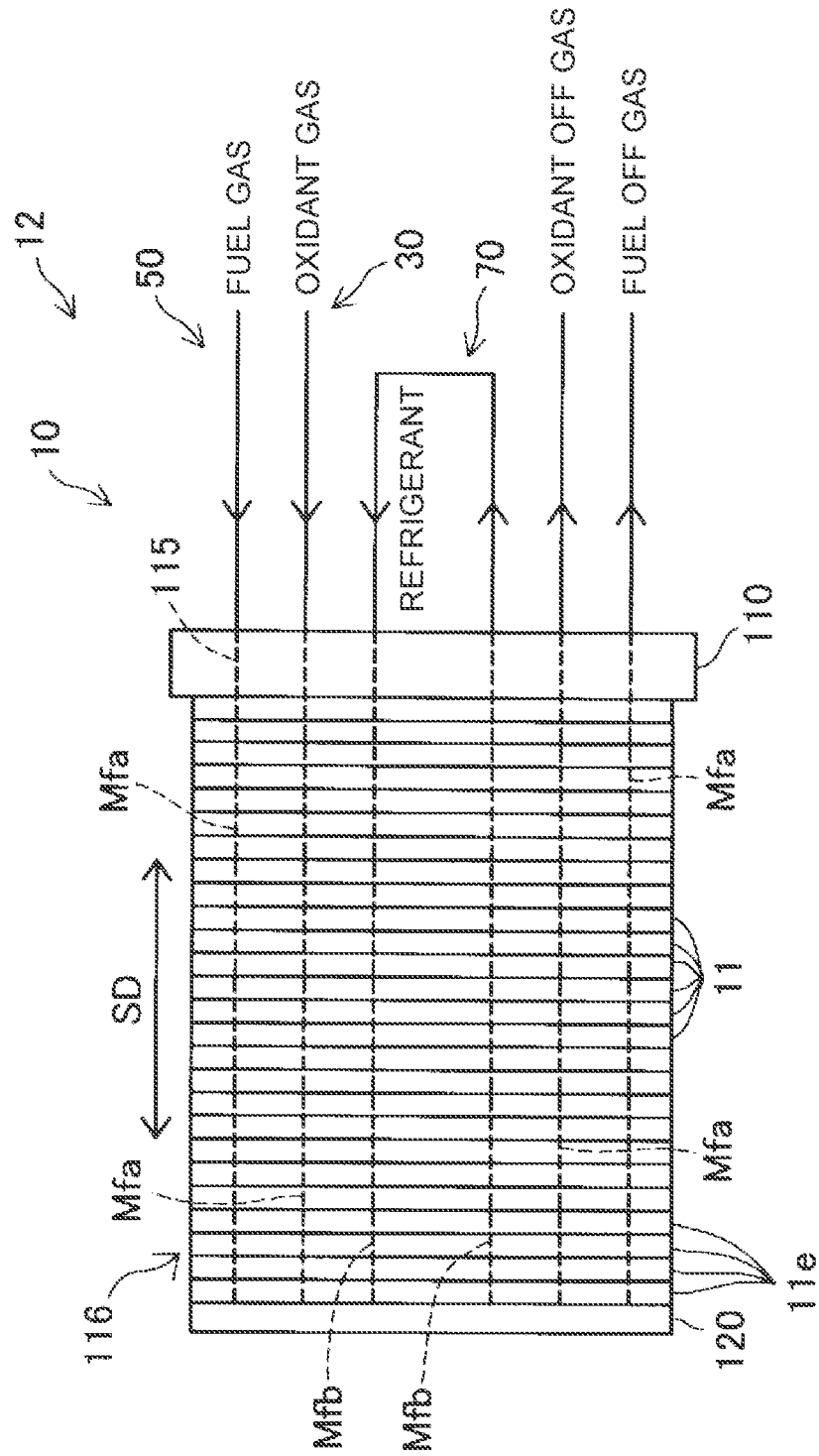
FIG. 1 illustrates a schematic configuration of a fuel cell system.

FIG. 1 illustrates a schematic configuration of a fuel cell system 10. The fuel cell system 10 is mounted on a fuel cell electric vehicle 12, for example, and used as a power generation device that drives a drive motor of the fuel cell electric vehicle 12. The fuel cell system 10 includes a fuel cell stack 116, a fuel gas supply/discharge system 50, an oxidant gas supply/discharge system 30, and a refrigerant circulation system 70.

The fuel cell stack 116 includes a plurality of fuel cells 11 and a pair of end terminals 110 and 120. The fuel cells 11 are each in a plate shape, and are stacked in a stacking direction SD corresponding to the thickness direction. The fuel cells 11 are each a solid polymer fuel cell battery supplied with an oxidant gas and a fuel gas as reaction gases to generate power through an electrochemical reaction between oxygen and hydrogen. In the present embodiment, the oxidant gas is air which contains oxygen, and the fuel gas is hydrogen. The fuel cells 11 are each a power generation element that can generate power by itself. The fuel cells 11 each include a membrane electrode assembly and two separators that interpose the membrane electrode assembly. The membrane electrode assembly has an electrolyte membrane, an anode disposed on one surface of the electrolyte membrane, and a cathode disposed on the other surface of the electrolyte membrane. An opening portion (not illustrated) is provided at the outer peripheral end portion of each of the fuel cells 11 to form a manifold Mfa that allows a flow of the reaction gases and reaction off gases that have passed through power generation portions. The manifold Mfa is branched and connected to the power generation portions of the fuel cells 11. In addition, an opening portion (not illustrated) is provided at the outer peripheral end portion of each of the fuel cells 11 to form a manifold Mfb that allows a flow of a refrigerant.

The end terminals 110 and 120 are disposed at opposite end portions of the fuel cells 11 in the stacking direction SD. Specifically, a first end terminal 110 is positioned at a first end portion of the fuel cell stack 116, and a second end terminal 120 is positioned at a second end portion, which is opposite from the first end portion, of the fuel cell stack 116. The first end terminal 110 has opening portions 115 formed as through holes that form the manifold Mfa and the manifold Mfb. On the other hand, the second end terminal 120 does not have opening portions 115 formed as through holes that form the manifold Mfa and the manifold Mfb. That is, the fuel gas, the oxidant gas, and the refrigerant are supplied to and discharged from only the first side of the fuel cell stack 116 in the stacking direction SD. Fuel cells 11 positioned on the side of the second end portion, among the plurality of fuel cells 11, are also called "end portion-side fuel cells 11e". In the present embodiment, the end portion-side fuel cells 11e include a fuel cell 11 positioned closest to the second end portion.

The fuel gas supply/discharge system 50 has a fuel gas supply function, a fuel gas discharge function, and a fuel gas circulation function. The fuel gas supply function is a function to supply the fuel gas to the anodes of the fuel cells 11. The fuel gas discharge function is a function to discharge the fuel gas discharged from the anodes of the fuel cells 11 (also referred to as "fuel off gas") to the outside. The fuel gas circulation function is a function to circulate the fuel gas within the fuel cell system 10.

The oxidant gas supply/discharge system 30 includes an oxidant gas supply function to supply the oxidant gas to the cathodes of the fuel cells 11, an oxidant gas discharge function to discharge the oxidant gas discharged from the cathodes of the fuel cells 11 (also referred to as "oxidant off gas") to the outside, and a bypass function to discharge the supplied oxidant gas to the outside not via the fuel cells 11.

The refrigerant circulation system 70 circulates the refrigerant through the fuel cell stack 116 to adjust the temperature of the fuel cell stack 116. Examples of the refrigerant include an antifreezing solution such as ethylene glycol and a liquid such as water.

Figure 2:
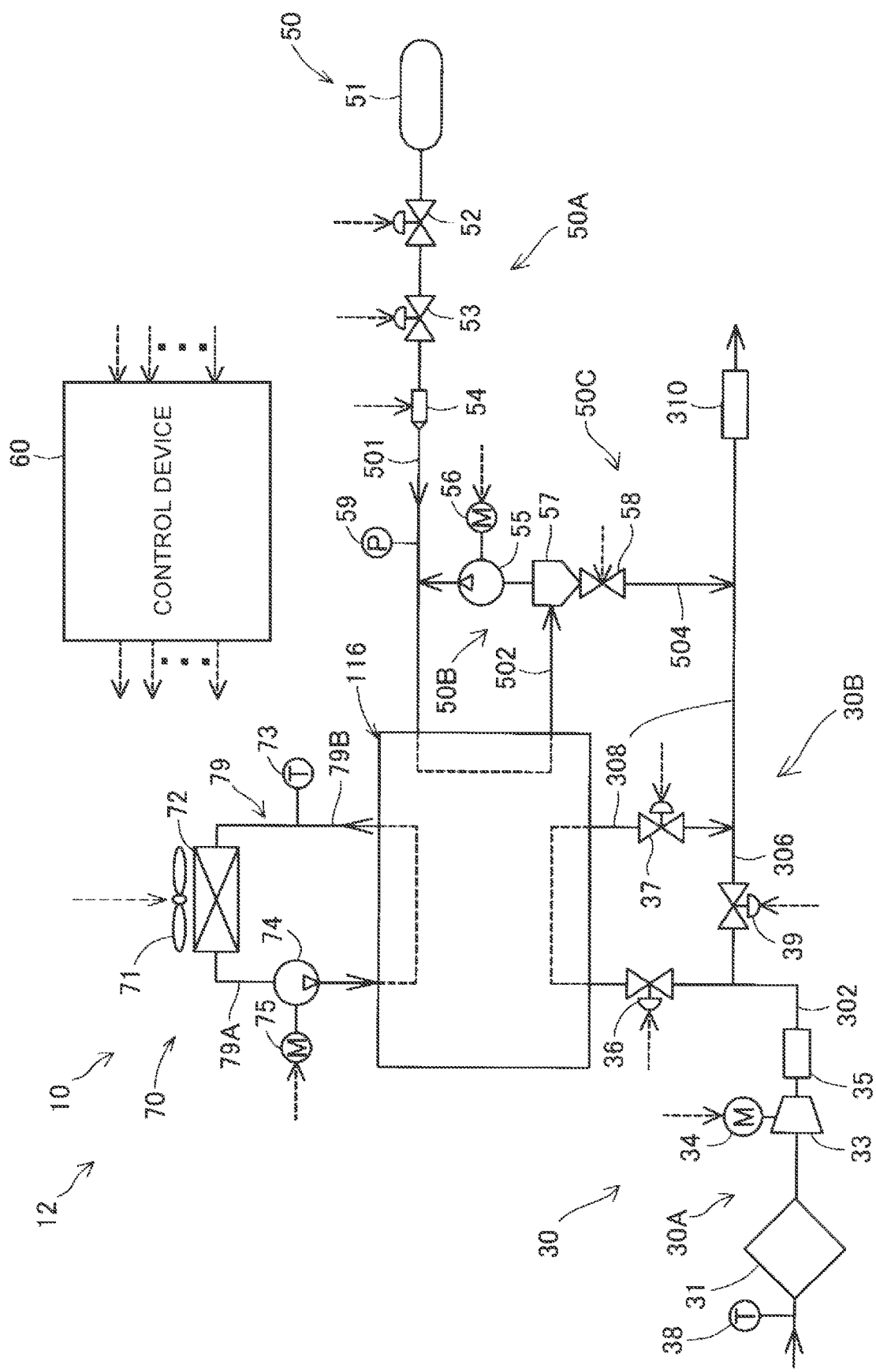
FIG. 2 illustrates a detailed configuration of the fuel cell system.

FIG. 2 illustrates a detailed configuration of the fuel cell system 10. In FIG. 2, the directions of the fuel gas, the oxidant gas, and the refrigerant which are supplied to the fuel cell stack 116 and discharged from the fuel cell stack 116 are indicated by arrows. The fuel cell system 10 has a control device 60, in addition to the fuel cell stack 116, the oxidant gas supply/discharge system 30, the fuel gas supply/discharge system 50, and the refrigerant circulation system 70 discussed above. The control device 60 controls operation of the fuel cell system 10. The control device 60 will be discussed in detail later.

The oxidant gas supply/discharge system 30 includes an oxidant gas supply system 30A and an oxidant gas discharge system 30B. The oxidant gas supply system 30A supplies the oxidant gas to the cathodes of the fuel cell stack 116. The oxidant gas supply system 30A has an oxidant gas supply path 302, an outside air temperature sensor 38 as a temperature sensor, an air cleaner 31, a compressor 33, a motor 34, an intercooler 35, and a first pressure regulation valve 36.

The oxidant gas supply path 302 is a pipe disposed upstream of the fuel cell stack 116 to communicate between the outside and the cathodes of the fuel cell stack 116. The outside air temperature sensor 38 measures a temperature related to the fuel cell system 10. Specifically, the outside air temperature sensor 38 measures the temperature of air as the oxidant gas to be taken into the air cleaner 31, that is, the outside air temperature as the ambient temperature. The result of the measurement by the outside air temperature sensor 38 is transmitted to the control device 60. The air cleaner 31 is provided in the oxidant gas supply path 302 upstream of the compressor 33, and removes foreign matter in the oxidant gas to be supplied to the fuel cell stack 116. The compressor 33 is provided in the oxidant gas supply path 302 upstream of the fuel cell stack 116, and discharges compressed air toward the cathodes in accordance with an instruction from the control device 60. The compressor 33 is driven by the motor 34 which operates in accordance with an instruction from the control device 60. The intercooler 35 is provided in the oxidant gas supply path 302 downstream of the compressor 33. The intercooler 35 cools the oxidant gas which has been compressed by the compressor 33 to become hot. The first pressure regulation valve 36 is an electromagnetic valve or an electric valve. The first pressure regulation valve 36 regulates the flow rate of the oxidant gas which is directed from the oxidant gas supply path 302 toward the fuel cell stack 116 with the opening degree of the first pressure regulation valve 36 regulated by the control device 60.

The oxidant gas discharge system 30B discharges the oxidant gas which has flowed through the cathodes to the outside. The oxidant gas discharge system 30B has an oxidant gas discharge path 308, a bypass path 306, a second pressure regulation valve 37, and a third pressure regulation valve 39. The oxidant gas discharge path 308 is a pipe that discharges, to the outside, the oxidant gas discharged from the cathodes of the fuel cell stack 116 (also referred to as "oxidant off gas") and the oxidant gas which has flowed through the bypass path 306. The second pressure regulation valve 37 is an electromagnetic valve or an electric valve. The second pressure regulation valve 37 regulates the back pressure in a cathode-side flow path of the fuel cell stack 116 with the opening degree of the second pressure regulation valve 37 regulated by the control device 60. The second pressure regulation valve 37 is disposed in the oxidant gas discharge path 308 upstream of a location where the bypass path 306 is connected to the oxidant gas discharge path 308. A muffler 310 is disposed at the downstream end portion of the oxidant gas discharge path 308.

The third pressure regulation valve 39 is disposed in the bypass path 306. The third pressure regulation valve 39 is an electromagnetic valve or an electric valve. The third pressure regulation valve 39 regulates the flow rate of the oxidant gas which flows through the bypass path 306 with the opening degree of the third pressure regulation valve 39 regulated by the control device 60. The bypass path 306 is a pipe that connects between the oxidant gas supply path 302 and the oxidant gas discharge path 308 not by way of the fuel cell stack 116.

The fuel gas supply/discharge system 50 includes a fuel gas supply system 50A, a fuel gas circulation system 50B, and a fuel gas discharge system 50C.

The fuel gas supply system 50A supplies the fuel gas to the anodes of the fuel cell stack 116. The fuel gas supply system 50A includes a fuel gas tank 51, a fuel gas supply path 501, an open/close valve 52, a regulator 53, an injector 54, and a pressure sensor 59. The fuel gas tank 51 stores a hydrogen gas at a high pressure, for example. The fuel gas supply path 501 is a pipe connected to the fuel gas tank 51 and the fuel cell stack 116 to allow the fuel gas, which is directed from the fuel gas tank 51 toward the fuel cell stack 116, to flow therethrough. The open/close valve 52 allows the fuel gas in the fuel gas tank 51 to flow downstream when the valve is open. The regulator 53 regulates the pressure of the fuel gas upstream of the injector 54 under control by the control device 60. The injector 54 is disposed in the fuel gas supply path 501 upstream of a location where a fuel gas circulation path 502 to be discussed later is merged at the fuel gas supply path 501. The injector 54 is an open/close valve driven electromagnetically in accordance with a drive period and a valve opening time set by a control section 62, and regulates the amount of the fuel gas to be supplied to the fuel cell stack 116. The pressure sensor 59 measures the internal pressure (supply pressure of the fuel gas) of the fuel gas supply path 501 downstream of the injector 54. The measurement result is transmitted to the control device 60.

The fuel gas circulation system 50B circulates the fuel gas discharged from the fuel cell stack 116 (also referred to as "fuel off gas") to the fuel gas supply path 501 again. The fuel gas circulation system 50B has a fuel gas circulation path 502, a gas-liquid separator 57, a circulation pump 55, and a motor 56. The fuel gas circulation path 502 is a pipe connected to the fuel cell stack 116 and the fuel gas supply path 501 to allow the fuel off gas, which is directed toward the fuel gas supply path 501, to flow therethrough. The gas-liquid separator 57 is provided in the fuel gas circulation path 502, and separates liquid water from an anode off gas in which liquid water is mixed. The circulation pump 55 drives the motor 56 to circulate the anode off gas in the fuel gas circulation path 502 toward the fuel gas supply path 501.

The fuel gas discharge system 50C discharges the anode off gas and liquid water generated through power generation by the fuel cell stack 116 to the outside. The fuel gas discharge system 50C has an air discharge/water discharge path 504 and an air discharge/water discharge valve 58. The air discharge/water discharge path 504 is a pipe that communicates between a discharge port of the gas-liquid separator 57, which discharges liquid water, and the outside.

The air discharge/water discharge valve 58 is disposed in the air discharge/water discharge path 504, and opens and closes the air discharge/water discharge path 504. Examples of the air discharge/water discharge valve 58 include a diaphragm valve. During normal operation of the fuel cell system 10, the control device 60 instructs the air discharge/water discharge valve 58 to open at a timing determined in advance.

The refrigerant circulation system 70 includes a refrigerant circulation path 79, a refrigerant circulation pump 74, a motor 75, a radiator 72, a radiator fan 71, and a stack temperature sensor 73.

The refrigerant circulation path 79 has a refrigerant supply path 79A and a refrigerant discharge path 79B. The refrigerant supply path 79A is a pipe that supplies the refrigerant to the fuel cell stack 116. The refrigerant discharge path 79B is a pipe that discharges the refrigerant from the fuel cell stack 116. The refrigerant circulation pump 74 is driven by the motor 75 to feed the refrigerant in the refrigerant supply path 79A to the fuel cell stack 116. The radiator fan 71 feeds air to the radiator 72 to radiate heat and cool the refrigerant which flows inside the radiator 72. The stack temperature sensor 73 measures a temperature related to the fuel cell system 10. Specifically, the stack temperature sensor 73 measures the temperature of the refrigerant in the refrigerant discharge path 79B. The result of measuring the temperature of the refrigerant is transmitted to the control device 60. The control device 60 controls operation of the fuel cell system 10 using the temperature measured by the stack temperature sensor 73 as the temperature of the fuel cell stack 116. The refrigerant circulation system 70 may include a heater that heats the refrigerant. Alternatively, in place of the outside air temperature sensor 38, the stack temperature sensor 73 may be used as the temperature sensor described in the SUMMARY.

Figure 3:
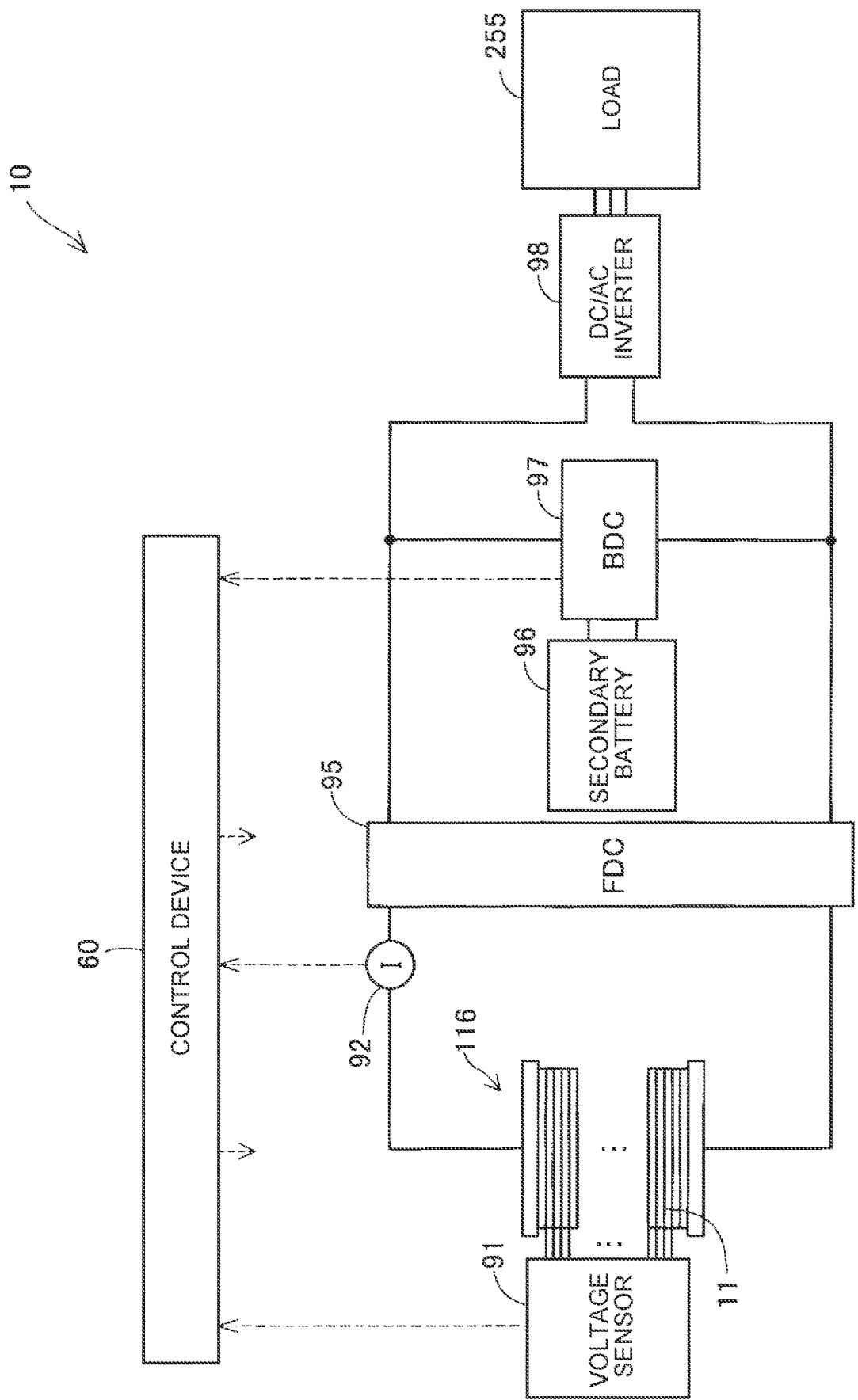
FIG. 3 is a conceptual diagram illustrating the electrical configuration of the fuel cell system.

FIG. 3 is a conceptual diagram illustrating the electrical configuration of the fuel cell system 10. The fuel cell system 10 includes a fuel-cell direct-current/direct-current converter (FDC) 95, a direct-current/alternating-current (DC/AC) inverter 98, a voltage sensor 91, and a current sensor 92.

The voltage sensor 91 is used to measure the voltage of the fuel cell stack 116. The voltage sensor 91 is connected to each of all the fuel cells 11 of the fuel cell stack 116, and measures the voltage of each of all the fuel cells 11. The voltage sensor 91 transmits the measurement result to the control device 60. The total voltage of the fuel cell stack 116 is obtained by summing the voltages of all the fuel cells 11 measured by the voltage sensor 91. The fuel cell system 10 may have a voltage sensor that measures voltages of both ends of the fuel cell stack 116, in place of the voltage sensor 91. In this case, the measured voltage values of both ends are used as the total voltage of the fuel cell stack 116. The current sensor 92 measures the value of a current output from the fuel cell stack 116, and transmits the measurement result to the control device 60.

The FDC 95 is a circuit configured as a direct-current/direct-current (DC/DC) converter. The FDC 95 controls the output voltage of the fuel cell stack 116 based on a voltage command value transmitted from the control device 60. The FDC 95 also controls the output current of the fuel cell stack 116 based on a current command value transmitted from the control device 60. The current command value is a value as a target value for the output current of the fuel cell stack 116, and is set by the control device 60. The control device 60 generates the current command value by calculating a required current value based on required generated power of the fuel cell stack 116, for example.

The DC/AC inverter 98 is connected to the fuel cell stack 116 and a load 255 such as a drive motor. The DC/AC inverter 98 converts DC power output from the fuel cell stack 116 into AC power to be supplied to the load 255.

The fuel cell system 10 further includes a secondary battery 96 and a battery direct-current/direct-current converter (BDC) 97. The secondary battery 96 is constituted of a lithium-ion battery, for example, and functions as an auxiliary power source. In addition, the secondary battery 96 supplies power to the load 255, and is charged with power generated or regenerated by the fuel cell stack 116. That is, the secondary battery 96 is used to be charged with and discharge power generated by the fuel cell stack 116.

The BDC 97 is a circuit constituted as a DC/DC converter together with the FDC 95, and controls charge and discharge of the secondary battery 96 in accordance with an instruction from the control device 60. The BDC 97 measures the state of charge (SOC: remaining capacity) of the secondary battery 96, and transmits the measurement result to the control device 60.

Figure 4:
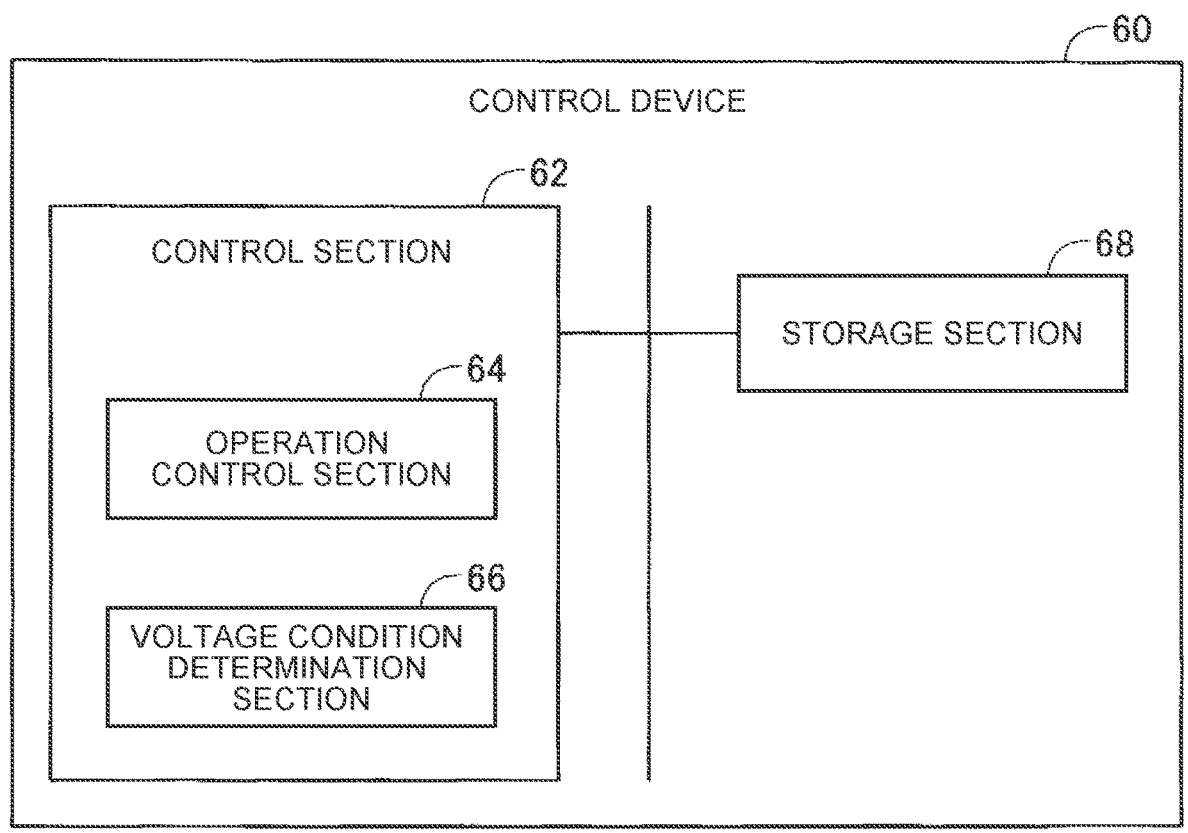
FIG. 4 is an internal block diagram of a control device.

FIG. 4 is an internal block diagram of the control device 60. The control device 60 includes a storage section 68 constituted from a random access memory (RAM) or a read only memory (ROM), and the control section 62. The control section 62 controls operation of the fuel cell system 10 based on a measured voltage value Vt measured by the voltage sensor 91, for example.

The storage section 68 stores various programs to be executed by the control section 62. The control section 62 executes the various programs in the storage section 68 to function as an operation control section 64 and a voltage condition determination section 66. The operation control section 64 controls operation of the fuel cell system 10 in accordance with the measured voltage value Vt etc. The voltage condition determination section 66 functions when a start switch of the fuel cell system 10 is turned on to start the fuel cell system 10 and warm-up operation, in which the temperature of the fuel cell stack 116 is rapidly raised through low-efficiency operation, is executed. The warm-up operation is executed when the measured value of the outside air temperature sensor 38 indicates a temperature below the freezing point, for example. The term "warm-up operation" refers to an operation state in which the temperature of the fuel cell stack 116 is raised using heat generated by the fuel cell stack 116 such that the temperature of the fuel cell stack 116 reaches a target temperature (e.g. 65° C.) determined in advance as a steady state. In the warm-up operation, the stoichiometric ratio of the oxidant gas to be supplied to the fuel cell stack 116 is set to be less than the stoichiometric ratio in the steady state, and the power generation loss of the fuel cell stack 116 is increased by increasing the oxygen concentration overvoltage. The "stoichiometric ratio of the oxidant gas" means the ratio of the amount of actually supplied oxygen to the minimum amount of oxygen required to generate required generated power. In the present embodiment, the stoichiometric ratio of the oxidant gas during the warm-up operation is about 1.0. The voltage condition determination section 66 determines whether a voltage condition determined in advance for executing the warm-up operation by starting current sweep, which corresponds to taking out a current from the fuel cell stack 116, is met. This will be discussed in detail later.

Figure 5:
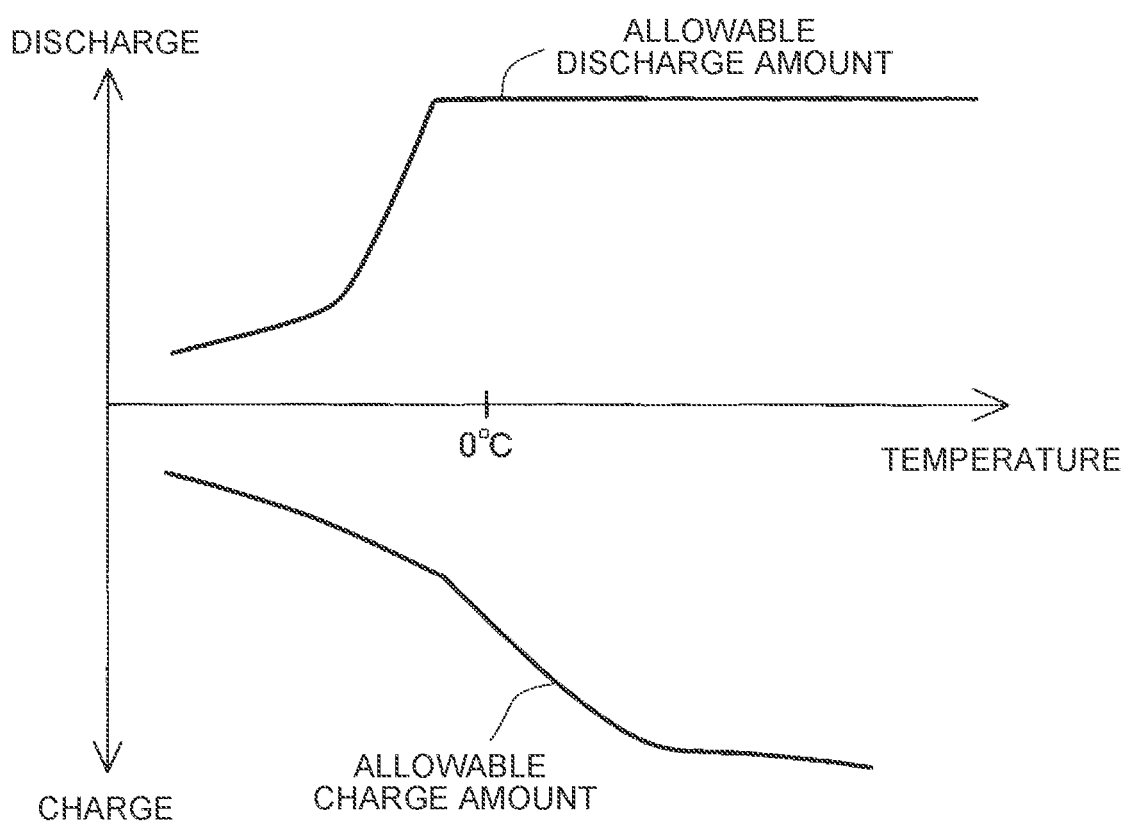
FIG. 5 indicates the temperature properties of a secondary battery.

FIG. 5 indicates the temperature properties of the secondary battery 96. Power that can be charged to and discharged from secondary batteries such as lithium-ion batteries is drastically limited when the temperature is below the freezing point, in particular −20° C. (Celsius) or lower. Consequently, when power generated by the fuel cell stack 116 exceeds or falls short of required generated power, it may be difficult to charge the secondary battery 96 with the excessive power or discharge power for supplementing the shortage from the secondary battery 96. Hence, when the measured value of the outside air temperature sensor 38 indicates a temperature below the freezing point, in particular −20° C. or lower, the fuel cell system 10 is preferably controlled such that the power generated by the fuel cell stack 116 does not significantly deviate from the required generated power.

Figure 6:
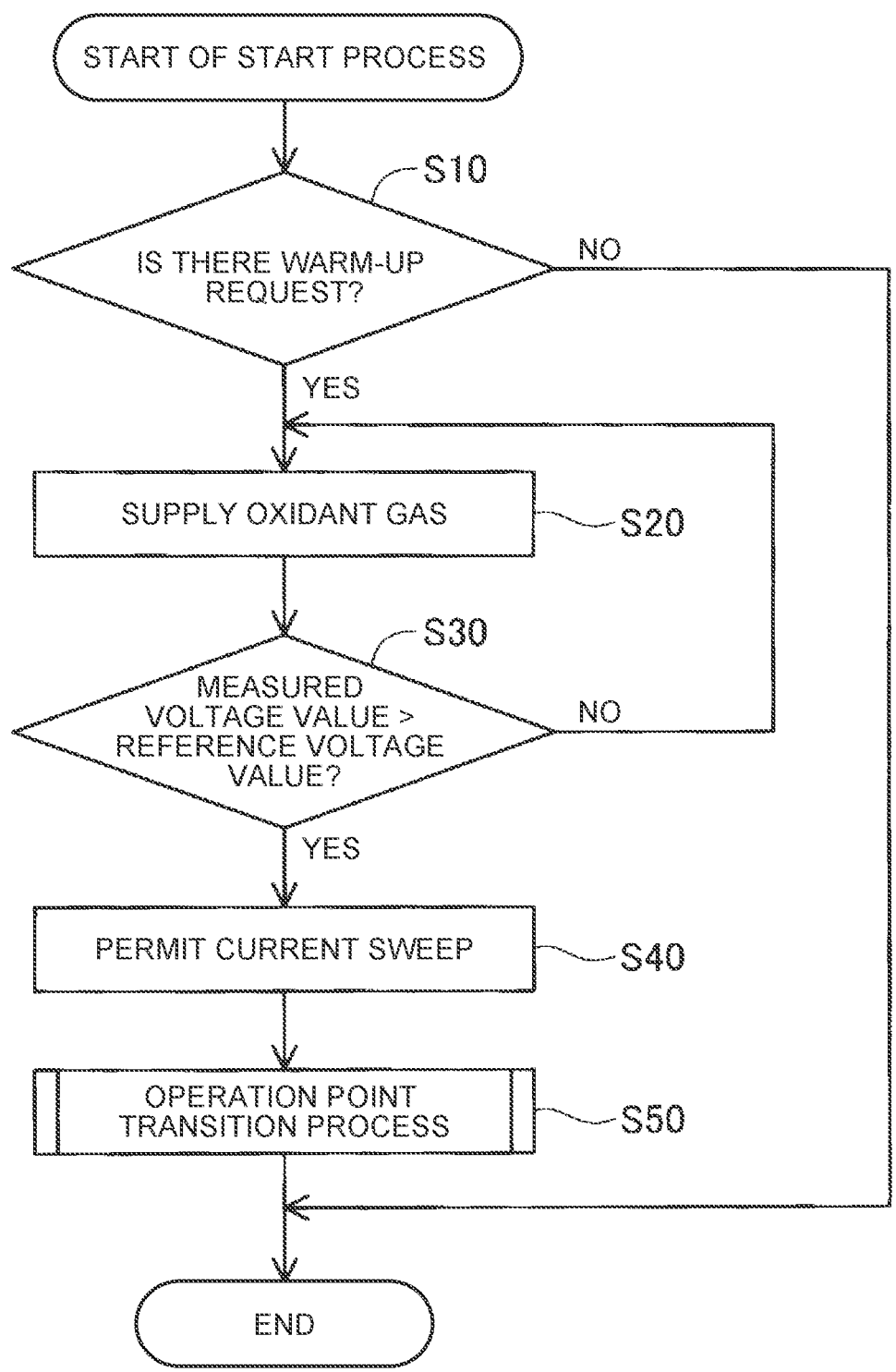
FIG. 6 is a flowchart illustrating a start process for the fuel cell system.
Figure 7:
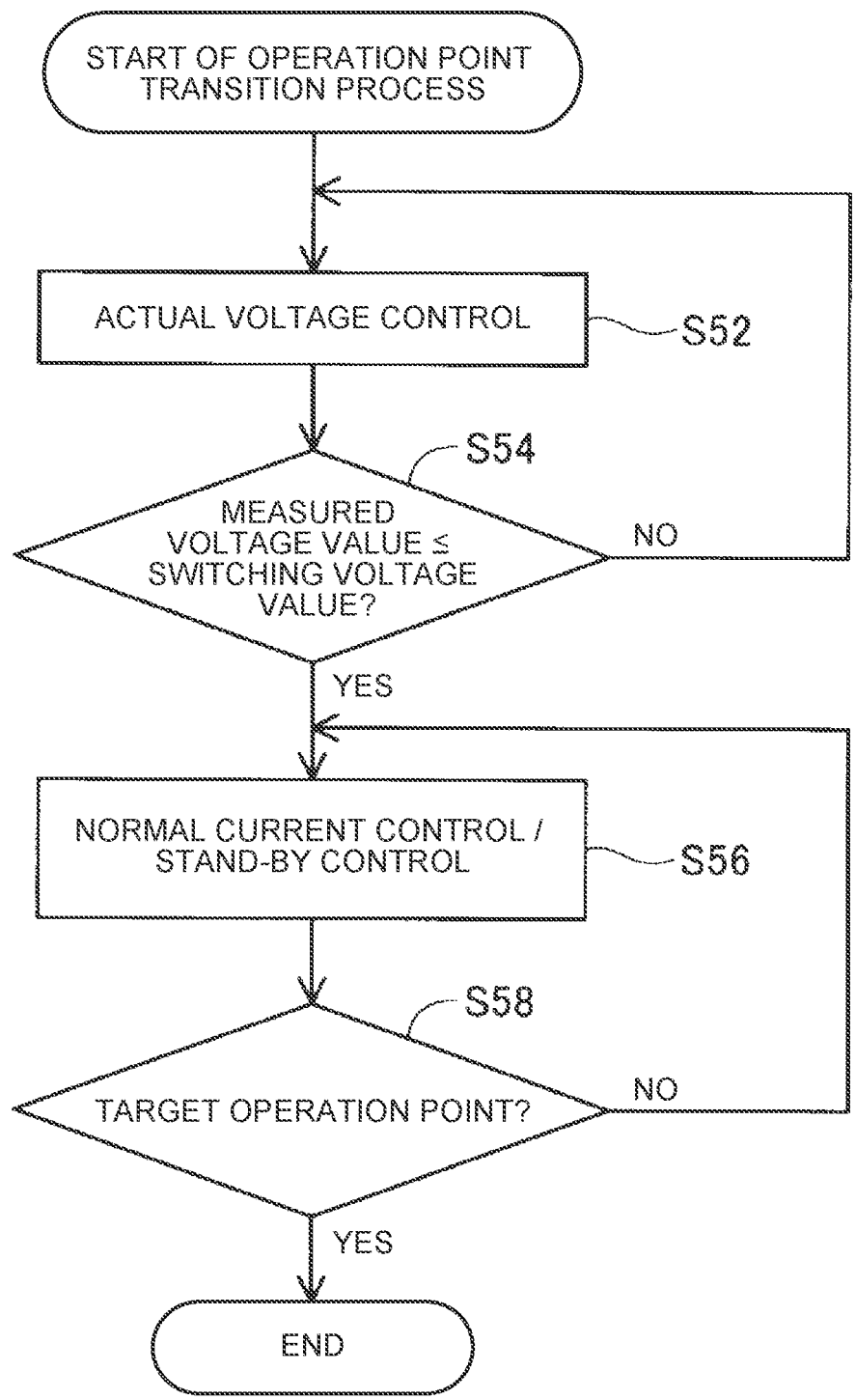
FIG. 7 is a flowchart illustrating an operation point transition process.
Figure 8:
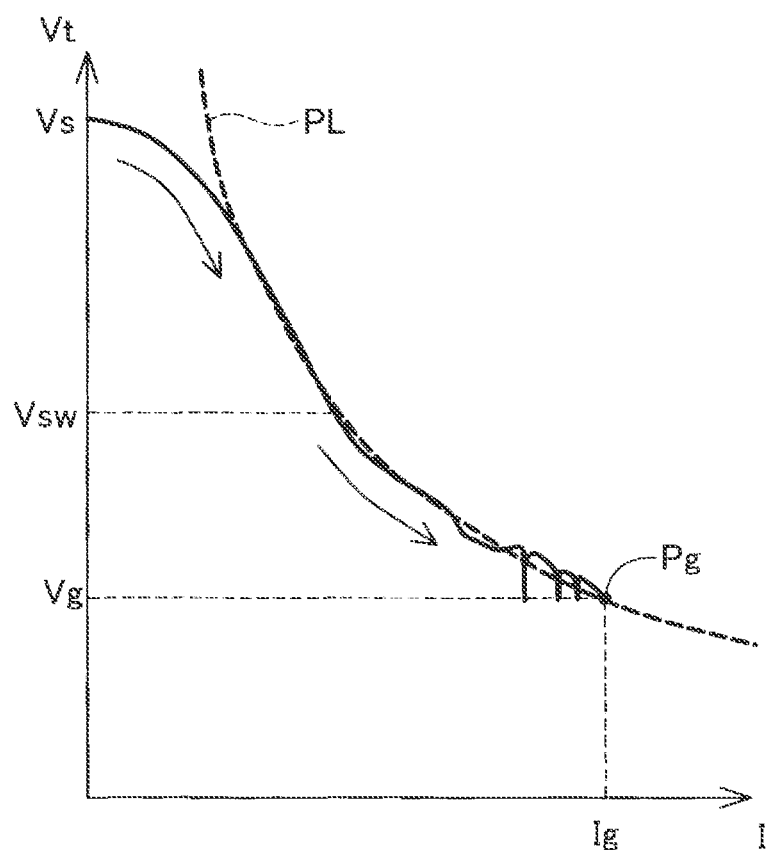
FIG. 8 is a first chart illustrating the relationship between the voltage and the current of the fuel cell stack.
Figure 9:
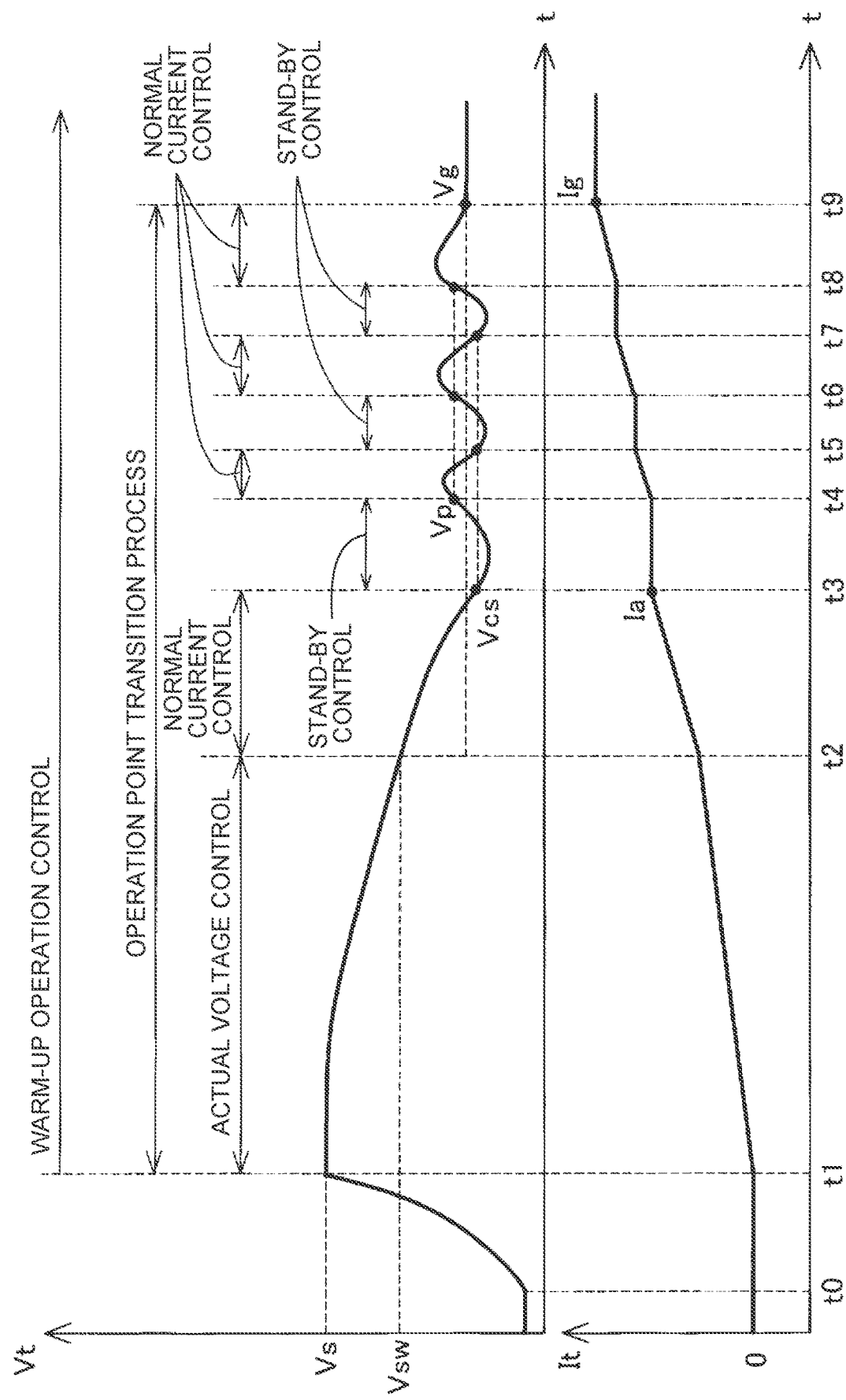
FIG. 9 is a second chart illustrating the relationship between the voltage and the current of the fuel cell stack.

FIG. 6 is a flowchart illustrating a start process for the fuel cell system 10. FIG. 7 is a flowchart illustrating an operation point transition process. FIG. 8 is a first chart illustrating the relationship between the voltage (total voltage) and the current of the fuel cell stack 116 from the start of the start process until a target operation point Pg is reached. FIG. 9 is a second chart illustrating the relationship between the voltage (total voltage) and the current of the fuel cell stack 116 from the start of the start process until the target operation point Pg is reached. The dashed curve indicated in FIG. 8 is an equal power line PL that connects operation points that indicate the same generated power as certain required generated power (e.g. required generated power at the target operation point Pg) of the fuel cell stack 116. The start process indicated in FIG. 6 is triggered when the start switch of the fuel cell system 10 is turned on.

As illustrated in FIG. 6, the control section 62 determines whether there is a warm-up request (step S10). In the present embodiment, the control section 62 determines that there is a warm-up request when the measured value of the outside air temperature sensor 38 indicates a temperature determined in advance or lower. The temperature determined in advance may be the freezing point, or may be a temperature that is lower than the freezing point, for example. When it is determined that there is no warm-up request (step S10: No), the control section 62 ends the start process. After the start process is ended, the control section 62 executes a normal power generation process in which the fuel cell stack 116 is caused to generate power in accordance with a request from the load 255, for example.

When it is determined that there is a warm-up request (step S10: Yes), on the other hand, the operation control section 64 starts to supply the oxidant gas, containing oxygen, to the cathode of each of the fuel cells 11 by controlling the oxidant gas supply/discharge system 30, including the oxidant gas supply system 30A, before executing warm-up operation by starting current sweep (step S20). Consequently, the voltage of the fuel cell stack 116 is raised until a voltage condition determined in advance is met. In addition, in step S20, the control section 62 starts to supply the fuel gas at a flow rate determined in advance to the anode of each of the fuel cells 11 by controlling the fuel gas supply/discharge system 50. In addition, in step S20, the control section 62 starts to circulate the refrigerant by controlling operation of the refrigerant circulation system 70.

The voltage condition determined in advance is set to a condition under which recombination of hydrogen at the cathode can be suppressed with hydrogen ions conducted from the anode to the cathode of each of the fuel cells 11 combined with oxygen existing at the cathode when warm-up operation is executed. That is, the voltage condition determined in advance is set to a voltage condition under which it can be determined that there exists oxygen enough to be combined with hydrogen ions conducted to the cathode. In the present embodiment, the voltage condition determined in advance is prescribed in accordance with the total voltage value of the fuel cell stack 116, and is a condition that the measured voltage value (total measured voltage value) Vt which represents the total voltage value of the voltage sensor 91 has exceeded a reference voltage value Vs determined in advance. The reference voltage value Vs is Vc×Ln, for example. Vc is the cell reference voltage value of each fuel cell 11. Ln is the number of the stacked fuel cells 11. Vc is set to a value that can be determined that sufficient oxygen has been supplied to the cathodes of the fuel cells 11, for example, 0.88 V or more. The upper limit of Vc is a value with which degradation of catalyst layers of the fuel cells 11 can be suppressed. In the present embodiment, Vc is set to 0.88 V.

Subsequent to step S20, the voltage condition determination section 66 determines whether the measured voltage value Vt of the voltage sensor 91 has exceeded the reference voltage value Vs (step S30). When the measured voltage value Vt is equal to or less than the reference voltage value Vs (step S30: No), the operation control section 64 continues the process in step S20 without interrupting the process. When the measured voltage value Vt has become more than the reference voltage value Vs (step S30: Yes), on the other hand, the operation control section 64 permits current sweep from the fuel cell stack 116 (step S40), and starts the operation point transition process (step S50). That is, current sweep in the operation point transition process in step S50 is started when current sweep is permitted.

The operation point transition process is a process that is a part of the warm-up operation. As indicated by the direction of the arrows in FIG. 8, the operation point transition process is a process executed during a period (transition period) from the start of current sweep until the operation point of the fuel cell stack 116 reaches the target operation point Pg which is determined by a target voltage value Vg and a target current value Ig for the fuel cell stack 116. The control section 62 sets the voltage command value and the current command value such that an operation point, which is determined by the voltage value and the current value of the fuel cell stack 116, is on the equal power line PL, which indicates the same generated power as the required generated power of the fuel cell stack 116, when the operation point is caused to transition in at least a part of the transition period. In the present embodiment, the voltage command value and the current command value are set such that the operation point is on the equal power line PL when the operation point is caused to transition after the measured voltage value Vt has become equal to or less than a switching voltage value Vsw in the transition period. In another embodiment, the voltage command value and the current command value may be set such that the operation point is on the equal power line PL when the operation point is caused to transition in the entire transition period. After the operation point transition process, warm-up operation is executed until a target temperature determined in advance is reached at the target operation point Pg.

Before describing the details of the operation point transition process in step S50, the content of the processes up to the permission of current sweep in step S40 will be described with reference to FIG. 9. At time t0, it is determined that there is a warm-up request, and supply of the oxidant gas to the cathode of each of the fuel cells 11 is started. When the oxidant gas is supplied to the cathode, the total voltage of the fuel cell stack 116 is raised. In the present embodiment, the total voltage of the fuel cell stack 116 becomes more than the reference voltage value Vs at time t1. Consequently, the operation point transition process is executed at time t1. As indicated in FIG. 8, the operation point transition process is a process executed from the start of current sweep until the target operation point Pg is reached. In warm-up operation control including the operation point transition process, the rotational speed of the compressor 33 (FIG. 2) is preferably kept constant after a target rotational speed determined in advance is reached, in order to suppress significant fluctuations in required generated power of the fuel cell stack 116. Hence, in the warm-up operation control, the opening degree of the second pressure regulation valve 37 or the opening degree of the third pressure regulation valve 39 is adjusted to vary the flow rate of the oxidant gas to be supplied to the cathode after the compressor 33 reaches the target rotational speed. In the warm-up operation control according to the present embodiment, the first pressure regulation valve 36 is kept fully open.

As illustrated in FIG. 7, the operation control section 64 executes actual voltage control in a pre-switch period of the transition period (step S52). The pre-switch period is a period until the measured voltage value Vt reaches the switching voltage value Vsw. In the actual voltage control, the operation control section 64 sets the current command value based on the required generated power of the fuel cell stack 116 and the measured voltage value Vt of the voltage sensor 91 which is the actual voltage of the fuel cell stack 116. Specifically, the operation control section 64 calculates the current command value by dividing the required generated power by the measured voltage value Vt, and sets the current command value. In the actual voltage control, the operation control section 64 performs current sweep by controlling the FDC 95 such that the calculated current command value is achieved.

After the actual voltage control is started in step S52, the voltage condition determination section 66 determines whether the measured voltage value Vt has become equal to or less than the switching voltage value Vsw determined in advance (step S54). Step S52 is executed until the measured voltage value Vt becomes equal to or less than the switching voltage value Vsw. When the measured voltage value Vt has become equal to or less than the switching voltage value Vsw, the operation control section 64 executes one of normal current control and stand-by control (step S56). That is, one of the normal current control and the stand-by control is executed in a post-switch period, of the transition period, from the time when the measured voltage value Vt has become equal to or less than the switching voltage value Vsw until the time when the measured voltage value Vt reaches the target operation point Pg.

The stand-by control is executed with the normal current control suspended when a certain condition is met in the post-switch period. The switching voltage value Vsw is set to a value obtained by adding an addition voltage value Vad determined in advance to the target voltage value Vg. The addition voltage value Vad is preferably set to a value that does not fall below the target voltage value Vg even when excessive current sweep is caused. In the present embodiment, the addition voltage value Vad is set to 66 V.

In the normal current control, the control section 62 raises the current command value to the target current value Ig at a proportion determined in advance. The control section 62 suspends the normal current control and executes the stand-by control when the measured voltage value Vt reaches a control start voltage value which is smaller than the voltage command value. In the stand-by control, the control section 62 keeps the current command value constant by holding the current command value at the time when the measured voltage value Vt reaches the control start voltage value. Consequently, the control section 62 ends the stand-by control by permitting a change in the current command value when the measured voltage value Vt reaches a permission voltage value, which is equal to or more than the voltage command value, by raising the voltage of the fuel cell stack 116. The control start voltage value may be set such that the stand-by control is executed immediately after the measured voltage value Vt falls below the voltage command value, or may be set to be smaller than the voltage command value by a value (e.g. 5 V) determined in advance in consideration of the precision of the measured voltage value Vt. In addition, the permission voltage value may be the same value as the voltage command value, or may be a value that is larger than the voltage command value by a certain value (e.g. 5 V) in consideration of the precision of the measured voltage value Vt. In the stand-by control, the control section 62 may increase the flow rate of the oxidant gas to be supplied to the fuel cell stack 116 by adjusting the opening degree of the second pressure regulation valve 37 or the third pressure regulation valve 39 illustrated in FIG. 2. Consequently, the voltage of the fuel cell stack 116 can be raised more efficiently. The control section 62 can resume the normal current control by permitting a change in the current command value during execution of the stand-by control.

It is assumed that the measured voltage value Vt reaches the control start voltage value Vcs, which is smaller than the target voltage value Vg as the voltage command value, at time t3 as indicated in FIG. 9. At time t3, a measured current value It of the current sensor 92 (FIG. 3) has not reached the target current value Ig. In this case, the measured voltage value Vt reaches the control start voltage value Vcs at time t3, and thus the control section 62 suspends the normal current control and executes the stand-by control. That is, the control section 62 maintains the current command value at a constant value Ia by holding the current command value at time t3.

At time t4, the measured voltage value Vt reaches the permission voltage value Vp which is equal to or more than the target voltage value Vg as the voltage command value, and therefore the control section 62 ends the stand-by control and resumes the normal current control. Consequently, the current command value is raised again toward the target operation point Pg at the proportion determined in advance through the normal current control. The stand-by control is also executed in a similar manner in a period from time t5 to time t6 and a period from time t7 to time t8.

As illustrated in FIG. 7, the control section 62 determines whether the operation point (measured current value It and measured voltage value Vt) of the fuel cell stack 116 has reached the target operation point Pg (step S58). The control section 62 executes one of the normal current control and the stand-by control until the operation point reaches the target operation point Pg. When the operation point reaches the target operation point Pg, on the other hand, the control section 62 ends the operation point transition process. In the example illustrated in FIG. 9, the operation point reaches the target operation point Pg at time t9. After the operation point transition process is ended, the control section 62 executes warm-up operation at the target operation point Pg until the fuel cell stack 116 reaches the target temperature. The control section 62 determines whether a measured value of the stack temperature sensor 73 (FIG. 2) as the temperature of the fuel cell stack 116 has reached the target temperature.

With the first embodiment described above, warm-up operation can be performed after sufficient oxygen is provided to the cathodes of the fuel cell stack 116, by performing current sweep after the measured voltage value Vt meets a voltage condition determined in advance. Consequently, it is possible to reduce the possibility that pumping hydrogen is generated because of the lack of oxygen at the cathode during warm-up operation. By reducing the possibility that pumping hydrogen is generated, it is possible to suppress release of hydrogen to the outside via the oxidant gas discharge path 308. Additionally, the control section 62 sets the voltage command value and the current command value such that the operation point is on the equal power line PL when the operation point is caused to transition in the transition period, and thus deviation of the actual power generated by the fuel cell stack 116 from the required generated power can be suppressed. Consequently, the charge/discharge amount of the secondary battery can be controlled within a certain range.

With the first embodiment described above, in addition, the actual voltage control is executed in the pre-switch period, and thus an increase in the difference between the required generated power and the actual power generated by the fuel cell stack 116 can be suppressed while suppressing generation of pumping hydrogen. Consequently, the charge/discharge amount of the secondary battery 96 can be further controlled within a certain range.

With the first embodiment described above, in addition, the normal current control is executed in the post-switch period, and thus execution of excessive current sweep can be suppressed. With this embodiment, additionally, the shortage of oxygen at the cathode can be suppressed by executing the stand-by control when the normal current control is executed and the measured voltage value Vt reaches the control start voltage value. Thus, generation of pumping hydrogen can be suppressed.

B. Second Embodiment

Figure 10:
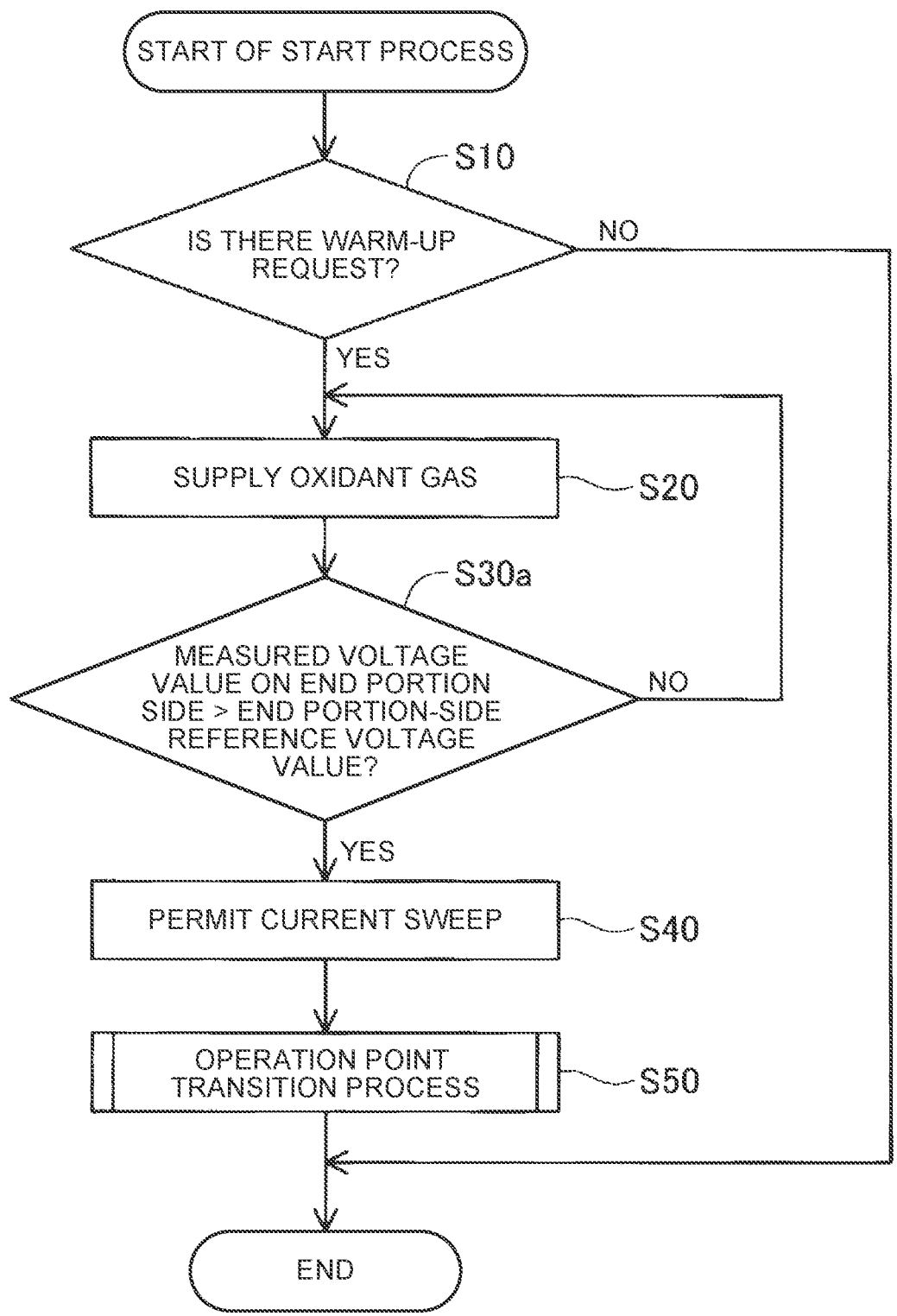
FIG. 10 is a flowchart illustrating a start process for a fuel cell system 10 according to a second embodiment.

FIG. 10 is a flowchart illustrating a start process for a fuel cell system 10 according to a second embodiment. The difference from the start process (FIG. 6) according to the first embodiment described above is step S30a. The other steps are the same between the first embodiment and the second embodiment, and therefore are given the same reference signs to omit description. In the second embodiment, the voltage condition which is determined in advance and under which current sweep is permitted is a condition that the measured voltage value of the end portion-side fuel cells 11e has become more than an end portion-side reference voltage value determined in advance.

Subsequent to step S20, the voltage condition determination section 66 determines whether the measured voltage value of the end portion-side fuel cells 11e which is measured by the voltage sensor 91 has exceeded an end portion-side reference voltage value Vce determined in advance (step S30a). The end portion-side reference voltage value Vce is set to a value that can be determined that sufficient oxygen has been supplied to the cathode of the end portion-side fuel cells 11e, for example, 0.8 V. When the determination in step S30a is made based on the respective measured voltage values of the plurality of end portion-side fuel cells 11e, the control section 62 determines whether the respective measured voltage values of the predetermined number of the end portion-side fuel cells 11e have become more than the end portion-side reference voltage value Vce, for example.

With the second embodiment described above, the same effects can be achieved for having the same configuration as that according to the first embodiment described above. For example, warm-up operation can be performed after sufficient oxygen is provided to the cathodes of the fuel cell stack 116, by performing current sweep after the measured voltage value of the end portion-side fuel cells 11e meets a voltage condition determined in advance. Consequently, it is possible to reduce the possibility that pumping hydrogen is generated because of the lack of oxygen at the cathode during warm-up operation. By reducing the possibility that pumping hydrogen is generated, it is possible to suppress release of hydrogen to the outside via the oxidant gas discharge path 308. In addition, generation of pumping hydrogen can be further suppressed by determining whether the voltage value of the end portion-side fuel cells 11e which are positioned on the side of the second end portion meets a voltage condition determined in advance, even if the fuel cell stack 116 is so long in the stacking direction SD that it takes a considerable time for the oxidant gas to reach the side of the second end portion. That is, generation of pumping hydrogen can be further suppressed by determining whether the measured voltage value of the end portion-side fuel cells 11e meets a voltage condition determined in advance, the voltage of the end portion-side fuel cells 11e being raised slowly, even when the voltage rise due to supply of the oxidant gas is slower on the side of the second end portion of the fuel cell stack 116 than on the side of the first end portion of the fuel cell stack 116 since the oxidant gas reaches the side of the second end portion later than the side of the first end portion.

C. Other Embodiments

C-1. First Other Embodiment

In the first embodiment described above, the fuel gas, the oxidant gas, and the refrigerant are supplied to and discharged from only the side of the first end portion of the fuel cell stack 116 of the fuel cell system 10. However, the present disclosure is not limited thereto. For example, the fuel gas, the oxidant gas, and the refrigerant may be supplied to the side of the first end portion of the fuel cell stack 116 of the fuel cell system 10, and discharged from the side of the second end portion, for example.

C-2. Second Other Embodiment

The control section 62 starts current sweep when the total voltage value of the fuel cell stack 11b meets a voltage condition in the first embodiment described above, and starts current sweep when the voltage value of the end portion-side fuel cells 11e meets a voltage condition in the second embodiment described above. However, the present disclosure is not limited thereto. For example, current sweep may be started when the voltage value of the fuel cells 11 which are positioned on the first side of fuel cell stack 11b or the voltage value of the fuel cells 11 which are positioned at the middle meets a voltage condition.

C-3. Third Other Embodiment

In each of the embodiments described above, the control section 62 executes the actual voltage control, the normal current control, and the stand-by control in the transition period. However, the present disclosure is not limited thereto. For example, the control section 62 may not execute the stand-by control, or may execute only one of the actual voltage control and the normal current control, in the transition period. In addition, control for temporarily reducing the current command value may be performed in the transition period, for example.

C-4. Fourth Other Embodiment

In each of the embodiments described above, in step S10 indicated in FIG. 6, the control section 62 determines that there is a warm-up request when the measured value of the outside air temperature sensor 38 indicates a temperature determined in advance or lower. However, the present disclosure is not limited thereto. For example, the control section 62 may determine that there is a warm-up request when the measured value of the stack temperature sensor 73 indicates a temperature determined in advance or lower.

The present disclosure is not limited to the embodiments discussed above, and can be implemented in various configurations without departing from the scope and spirit of the present disclosure. For example, the technical features of the embodiments corresponding to the technical features in the aspects described in the SUMMARY field can be replaced or combined, as appropriate, in order to solve some or all of the issues discussed above or achieve some or all of the effects discussed above. In addition, the technical features can be deleted, as appropriate, unless such technical features are described as essential herein.

What is claimed is:

1. A fuel cell system comprising:
   a fuel cell stack that has a plurality of stacked fuel cells each having an anode and a cathode;
   a voltage sensor configured to measure a voltage of the fuel cell stack;
   an oxidant gas supply system configured to supply the cathode with an oxidant gas containing oxygen;
   a fuel gas supply system configured to supply the anode with a fuel gas;
   a temperature sensor configured to measure a temperature related to the fuel cell system;
   a secondary battery configured to be charged with power generated by the fuel cell stack and discharge the power; and
   a control device configured to control operation of the fuel cell system based on a measured voltage value measured by the voltage sensor, wherein:
   the control device is configured to, when the fuel cell system is started and a value measured by the temperature sensor is equal to or less than a temperature determined in advance,
      raise the voltage of the fuel cell stack until a voltage condition determined in advance is met, by causing the oxidant gas supply system to operate and supplying the cathode with the oxidant gas before current sweep from the fuel cell stack is started, and
      execute warm-up operation in which a temperature of the fuel cell stack is raised, by starting the current sweep when the measured voltage value meets the voltage condition; and
   the control device is configured to, when executing the warm-up operation, set a voltage command value and a current command value such that an operation point determined by a voltage value and a current value of the fuel cell stack is on an equal power line of the fuel cell stack, which indicates the same generated power as required generated power of the fuel cell stack, when the operation point is caused to transition in at least a part of a transition period from the start of the current sweep until the operation point reaches a target operation point determined by a target voltage value and a target current value during the warm-up operation.

2. The fuel cell system according to claim 1, wherein the control device is configured to:
   execute normal current control in which the current command value is raised to the target current value at a proportion determined in advance in a post-switch period, of the transition period, from a time when the measured voltage value has become equal to or less than a switching voltage value determined in advance until a time when the measured voltage value reaches the target voltage value of the target operation point;
   suspend the normal current control and execute stand-by control in which the current command value is kept constant when the normal current control is executed and the measured voltage value reaches a control start voltage value which is less than the voltage command value; and
   end the stand-by control and resume the normal current control by permitting a change in the current command value when the measured voltage value reaches a permission voltage value which is equal to or more than the voltage command value during execution of the stand-by control.

3. The fuel cell system according to claim 1, wherein:
   the voltage sensor is configured to measure a total voltage of the fuel cell stack; and
   the voltage condition is a condition that a value of the total voltage as the measured voltage value measured by the voltage sensor has become more than a reference voltage value determined in advance.

4. The fuel cell system according to claim 1, wherein:
   supply of the oxidant gas to the fuel cell stack is performed on a side of a first end portion of the fuel cell stack in a stacking direction in which the fuel cells are stacked;
   the voltage sensor is configured to measure a voltage of an end portion-side fuel cell which is a fuel cell among the fuel cells, the end portion-side fuel cell being positioned on a side of a second end portion which is opposite from the side of the first end portion; and the voltage condition is a condition that a voltage value of the end portion-side fuel cell as the measured voltage value measured by the voltage sensor has become more than an end portion-side reference voltage value determined in advance.

\* \* \* \* \*